Jan. 7, 1969  R. W. YOUNG ET AL  3,420,601
MATERIALS AND STRUCTURES FOR OPTICAL FARADAY ROTATION DEVICES
Filed June 24, 1965  Sheet 1 of 3
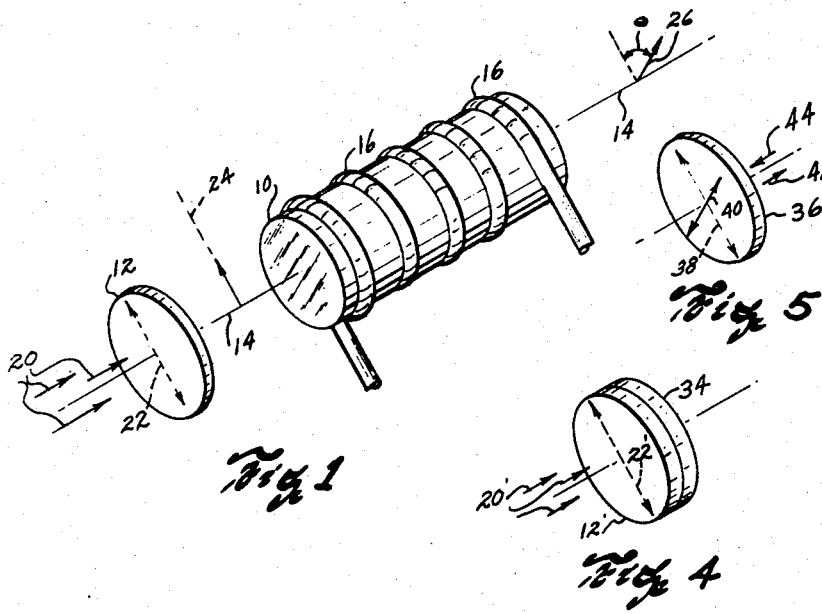
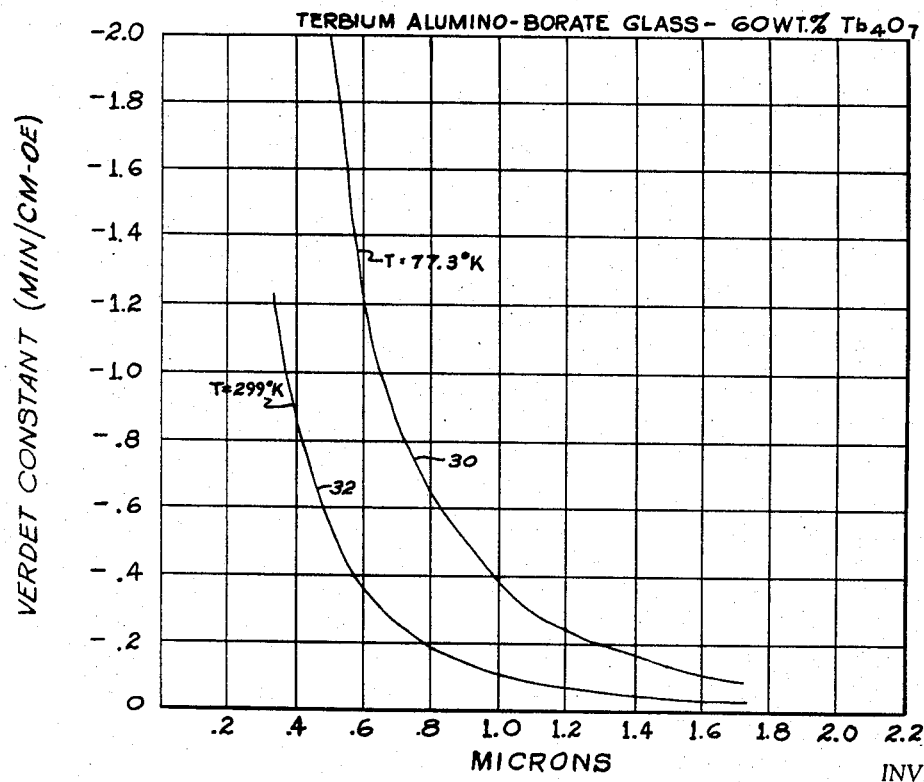
INVENTORS
ROBERT W. YOUNG
ROBERT E. GRAF
CHARLES C. ROBINSON
BY Stanley J. Yarner
ATTORNEY

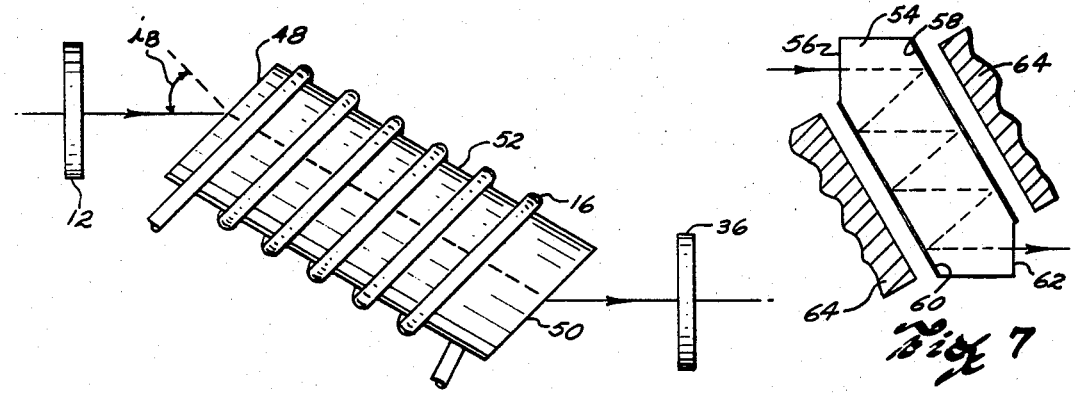
Fig. 6
Fig. 7
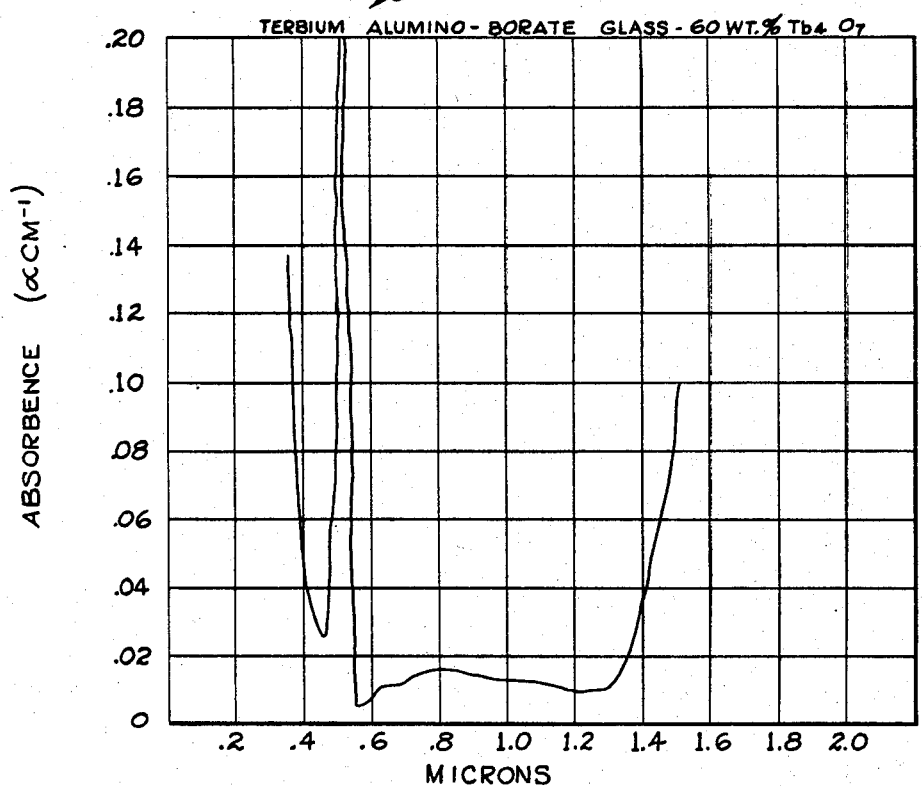
Fig. 3
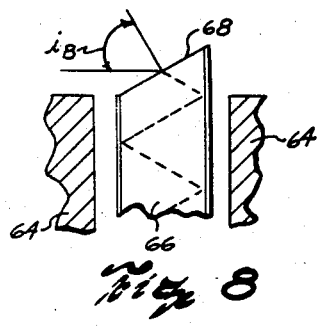
Fig. 8 ns
Patented Jan. 7, 1969

3,420,601
MATERIALS AND STRUCTURES FOR OPTICAL FARADAY ROTATION DEVICES
Robert W. Young, Woodstock, Conn., and Robert E. Graf and Charles C. Robinson, Southbridge, Mass., assignors to American Optical Company, Southbridge, Mass., a voluntary association of Massachusetts
Filed June 24, 1965, Ser. No. 466,594
U.S. Cl. 350—151    9 Claims
Int. Cl. G02f 1/22

This invention relates to improvements in Faraday rotators and the like having large Verdet constants for polarized light and at the same time low absorbence for use in Faraday isolators, shutters and other devices requiring large magneto-optic effects. More particularly, this invention is useful for providing a material having a large Verdet constant for polarized light and at the same time good light transmission characteristics for unpolarized light of a selected wave length within a predetermined wave length region of the optical spectrum, so as to be useful in optical systems for allowing or preventing the passage of and for variously controlling the rotation of the plane of polarization of polarized light passing therethrough.

It should be noted that when a beam of plane polarized light passes through a plate of ordinary glass which is being subjected to a magnetic field and with this light travelling in the direction of the lines of force of this magnetic field, the plane of polarization of the light will be rotated somewhat due to what is commonly called its Faraday magneto-optic effect. While certain known glasses, such as heavy lead silicate glasses, have been used heretofore as Faraday rotators, they have not functioned as well as might be desired, for they have failed to provide as high Verdet constants ($V=.071$ at 700 m$\mu$) as might be desired. Additionally, since they are not paramagnetic, they do not increase their respective Verdet constants with decreases in temperature. Another known glass, a metaphosphate glass containing rare earth metal oxides, has likewise been used as a Faraday rotator but has exhibited only a fair value for Verdet constant. Also, Faraday rotation has been obtained by other materials which have exhibited large Verdet constant values, but these latter materials have been poor in light transmission and, accordingly, could not be used in thicknesses sufficient to give a rotation of desired magnitude.

It has been found that zinc and alumino borate glasses, such as those according to the invention to be described herein, are easy to manufacture, since they require low melting temperatures and have a high solubility for the rare earths. Furthermore, it is found that the borates intrinsically possess a high optical quality for accomplishing the desired Faraday effects.

Accordingly, a principal object of the present invention is to provide improved Faraday rotation means in the form of an optical device having a large Verdet constant and high light-transmittance or low absorbence for use in Faraday isolators or shutters.

It is also an object of this invention to provide a large amount of a rare earth oxide in zinc and alumino borate glasses for use as an improved Faraday rotation means.

It is an additional object of the present invention to provide improved Faraday rotation devices and Faraday isolator devices formed of zinc and alumino borate glasses including a high percentage of a trivalent rare earth metal oxide selected to yield the desired magneto-optic effects.

These and other objects are accomplished in one illustrative embodiment of the invention wherein Faraday rotation and/or isolator means are formed of zinc and alumino borate glasses having large amounts of rare earth metal oxides selected from a group of trivalent rare earth metal oxides consisting of praseodymium oxide, $Pr^{3+}$, dysprosium oxide, $Dy^{3+}$, and terbium oxide, $Tb^{3+}$ or various chemically equivalent mixtures of any two or more oxides thereof, the percentage of said trivalent rare earth metal oxide or oxides being within a range of 40 to 75% by weight of the glass composition.

Other objects and advantages of the invention will become apparent from the detailed description which follows and reference to the accompanying drawings, in which:

FIG. 1 is a diagrammatic perspective view showing optical means including a Faraday rotation element formed of a glass embodying the present invention;

FIG. 2 is a plot showing Verdet constant values of an improved glass embodying the present invention at two different temperatures and at various wavelengths in the ultra-violet, visible and parts of the infra-red regions of the spectrum;

FIG. 3 is a plot showing absorbence values for the improved Faraday rotator glasses according to the present invention at different wavelengths.

FIG. 4 is a perspective view of a polarizing element for use with the structure of FIG. 1;

FIG. 5 is a perspective view of another polarizing means for use with the structure of FIG. 1;

FIG. 6 is a side elevational view of a modified form of a Faraday rotator structure;

FIG. 7 is a side elevational view of another form of Faraday rotator structure;

FIG. 8 is a fragmentary side elevational view of still another modified form of Faraday rotator structure.

Figure 9A:
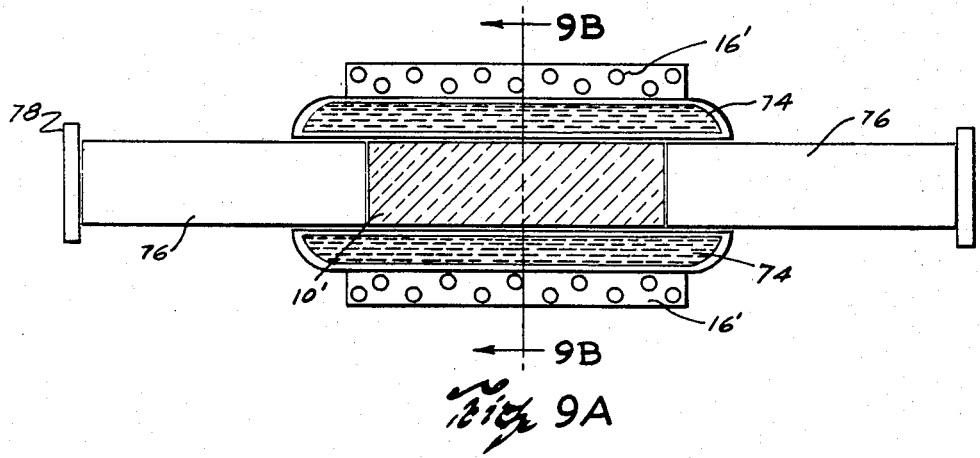
FIGS. 9A and 9B are front elevation and section views, respectively, of a Faraday isolator for operation at temperatures below room temperature.

Referring to FIGURE 1 of the drawing, it will be seen that Faraday rotation means 10 in the form of an elongated, preferably cylindrically shaped member or element of appreciable length with optically finished plane parallel entrance and exit faces is in spaced optically aligned relation to a light-polarizing member 12 along a common optical axis 14. Around this elongated element 10 is arranged the coils 16 of a solenoid, or the like, which may be connected in conventional manner to a suitable source of electronic current for creating and controlling the strength of and the direction of an electro-magnetic field, which has its central lines of force extending through the elongated element in directions generally parallel to the optical axis 14.

A light source (not shown) is arranged to direct light, as suggested by the arrows 20, onto light-polarizing member 12, whose plane of polarization is indicated by the double-headed arrow 22. Light which passes through polarizer 12 will be linearly polarized, vibrating in the direction indicated by arrow 24, and the plane of vibration of this light, after passing through the elongated rotation element 10, is indicated by arrow 26. The orientation of the light as depicted by arrow 26 is after rotation by an angular amount $\theta$ of the light in the elongated element 10 by the magnetic field of the solenoid 16.

The elongated rotation element 10 is formed of a zinc or alumino borate glass to which has been added large amounts of a trivalent rare earth metal oxide selected from a group consisting of terbium oxide, praseodymium oxide, and dysprosium oxide, or a chemically equivalent mixture thereof comprising any one or more of these trivalent rare earth metal oxides.

It has been found that when such a zinc or alumino borate glass contains high concentrations of such rare earth oxides, it is the rare earth ions thereof which cause the glass to exhibit the large Verdet constants desired. These rare earth ions each have an unpaired electron in the ground state and are, therefore, paramagnetic; and, in the presence of a magnetic field, both at ground state and at upper excited states, are split into Zeeman components. It is difficult to tell what the exact energy level conditions for the ions of any one of these trivalent rare earth metal oxide zinc or alumino borate glasses are, because of the uncertainty of the effect of each different zinc or alumino borate glass matrix on these levels. Quantum mechanics, however, teaches that the electron transition probabilities between ground state and excited states are unequal for right-hand circularly polarized light waves and for left-hand circularly polarized light waves being propagated along the magnetic lines of force through the glass medium. This difference in transition probabilities arises because of the Zeeman effect mentioned above. Zeeman's splitting produces a difference in the frequency dependence of the right and left circular transitions, a difference in the oscillator strengths of these transitions, and a difference in the electron populations in the ground state Zeeman levels. This last-mentioned effect in the ground state gives rise to both the paramagnetism and the paramagnetic Faraday rotation associated with these ions.

It has been found that the paramagnetic Faraday rotation effect is approximately inversely proportional to temperature and for the ions of praseodymium, dysprosium and terbium is negative in sign. This is the dominant characteristic of the Faraday rotation associated with the trivalent rare earth metal oxide, zinc or alumino borate glasses of the present invention, since the first two of the three effects above-mentioned are smaller and essentially temperature-independent.

The Faraday rotation in the ions is primarily associated with strongly allowed electronic dipole $4f$–$5f$ transitions which occur in the ultra-violet and the transitions $4f$–$5f$ in the ions usually do not contribute a significant amount of Faraday rotation. Therefore, the Faraday rotation effect almost always increases as the wavelength of the radiation is changed to approach that of the strong ultra-violet absorption edge.

To take advantage of this Faraday effect, radiation in the form of light of a wavelength shorter than that of the absorption wavelength is directed into the glass, and under these conditions, the absorption transitions do not occur but the electrons make a virtual transition. Such a virtual transition decreases the velocity of propagation of the rotation that produces it and the closer the incident wavelength is to the absorption wavelength, the stronger the virtual transition becomes and the slower the light propagates.

It is noted that the right circularly polarized waves propagate faster than the left circularly polarized waves at room temperature and at temperatures lower than room temperatures. Thus, the index of refraction for the left circularly polarized wave in the medium is greater than that for the right circularly polarized wave, and the following equations express the relationship between the indices of refraction of these two circularly polarized components of the transmitted light and the magnetic field, $H_z$:

$$N^r = N - A(\lambda)H_z \quad (1)$$

$$N^l = N + A(\lambda)H_z \quad (2)$$

and wherein $\lambda$ is the wavelength employed in a vacuum, A is a factor dependent upon wavelength, and N is the refractive index of the element or medium in the absence of a magnetic field.

These two equations suggest that the indices of refraction of the two circularly polarized wave components within the rare earth glass element can be controlled by the magnetic field and that if the light within the glass is completely circularly polarized in one direction or the other (as in a manner which will be later described) the propagation of this light can be speeded up or slowed down by changing the strength of the axial magnetic field $H_z$.

When the element 10 is being used as a Faraday rotator, light that is linearly polarized, as by the polarizing member 12 in FIGURE 1, will be directed into the element and the light may be considered as being broken up into two counter-rotating circularly polarized components which then propagate through the medium 10 with the indices of refraction given by Equations 1 and 2. (It should be noted that the same general behavior or relationship can be considered as existing in the case of elliptically-polarized light entering the eletment 10.)

Thus, the two left and right circularly, or elliptically polarized components do not retain a fixed phase relation between themselves as they pass through the element 10, and upon emerging from the exist end of element 10, they will re-combine to form polarized light of the same character as that which initially entered. However, this light will be rotated by an angular amount $\theta$, and when the incident light is elliptically polarized, both axes of this elliptical polarization will be rotated through the same angular amount $\theta$.

The value of the angle $\theta$ is given by the following equation:

$$\theta = VHL \quad (3)$$

where V is the Verdet constant, H is the applied magnetic field in oersteds, and L is the length or thickness in centimeters of the glass element to be traversed. The angle $\theta$ is expressed in minutes and is positive in the direction of the current in the solenoid 16 generating the magnetic field H.

The parameter $A(\lambda)$ is related to the Verdet constant by the following relation:

$$A(\lambda) = \frac{V(\lambda)}{2\pi} \quad (4)$$

With these teachings in mind, the following represents the ranges of composition embodied in this invention for producing desirably low light absorbence and large Verdet constant values:

| | Wt. percent |
|---|---|
| $B_2O_3$ | 15–50 |
| $Al_2O_3$ | 0–10 |
| $SiO_2$ | 0–5 |
| ZnO | 0–10 |
| $Tb_4O_7$ | 60–73 |
| $Pr_6O_{11}$ | 40–65 |
| $Dy_2O_3$ | 50–65 | where only one rare earth oxide (either terbium, praseodymium, or dysprosium) is incorporated in any given batch. The other ingredients may be varied to yield specific physical properties. The oxides of praseodynium, terbium and dysprosium yield glasses of the highest Faraday rotation (largest Verdet constant) but it should be considered that the use of the oxides of neodymium, holmium and erbium yield glasses which are about one-half as strong rotators. For low absorbence, glass batch ingredients must not contain more than a few parts per million total iron and other transition elements.

The following are some typical glass compositions falling within the above-specified ranges as examples of the present invention:

TERBIUM SERIES (WT. PERCENT)

| Batch No. | 1 | 2 | 3 | 4 | 5 | 6 | 7 | 8 | 9 | 10 |
|---|---|---|---|---|---|---|---|---|---|---|
| $B_2O_3$ | 30 | 25 | 25 | 25 | 22 | 20 | 18 | 15 | 20 | 15 |
| $Al_2O_3$ | 10 | 10 | 7 | 5 | 10 | 10 | 10 | 10 | 10 | 5 |
| $Tb_4O_7$ | 60 | 60 | 63 | 65 | 63 | 65 | 67 | 70 | 60 | 65 |
| $SiO_2$ | | 5 | 5 | 5 | 5 | 5 | 5 | 5 | 5 | 5 |
| ZnO | | | | | | | | | 5 | 10 |

PRASEODYMIUM SERIES (WT. PERCENT)

| Batch No. | 11 | 12 | 13 | 14 | 15 | 16 | 17 | 18 | 19 |
|---|---|---|---|---|---|---|---|---|---|
| $B_2O_3$ | 50 | 40 | 40 | 30 | 35 | 29 | 32 | 20 | 25 |
| $Al_2O_3$ | 10 | 10 | | | | 2 | | 10 | 10 |
| $Pr_6O_{11}$ | 40 | 50 | 50 | 60 | 60 | 65 | 65 | 60 | 60 |
| $SiO_2$ | | | | | | | | 5 | 5 |
| ZnO | | | 10 | | 5 | 4 | 3 | 5 | |

Dysprosium Series

Batch #20 (Wt. percent)
B₂O₃ _____ 20
Al₂O₃ _____ 10
Dy₂O₃ _____ 60
SiO₂ _____ 5
ZnO _____ 5

The glasses are easily fabricated using platinium crucibles and the type of furnace used comprises elements of silicon carbide. Depending upon the actual composition, the melting temperature ranges from 2500° F. to 2700° F., with the refining temperature being approximately 100° F. higher and the the casting temperature 100° F. lower than the melting temperatures. Glasses are cast into preheated (1400° F.) graphite molds. The annealing of these glasses is extremely important with the recommended annealing ranges being between 1300° F. and 1400° F. The glass is held at its annealing point for approximately one hour and then cooled at the rate of 20° F. per hour. Depending upon the composition chosen, the above temperature range will yield birefringence below 10 mμ/cm.

It is desirable to have low strain birefringence in the glass because the strain birefringence will tend to depolarize the light that propagates through the glass. This depolarization will reduce the effectiveness of the analyzing element at the output of the optical device that employs the Faraday effect. For good performance, the strain birefringence should be less than 10 mμ/cm.

The temperature dependence of the Verdet constant is approximately given by the following equation:

$$V = A + \frac{B}{T} \quad (5)$$

The constitution of the A term is small compared to the paramagnetic B/T term at room temperatures. For lower temperatures, this term can become quite large and the paramagnetic term arises because of the previously-discussed Zeeman splitting occurring in the ground state of the rare earth ion. FIG. 2 shows an example of the increased magnitude of the Verdet constant at liquid temperature (77.3° K.) compared to room temperature (299° K.). The particular glass whose Verdet constant characteristics are shown in FIG. 2 contains 60 weight percent of Tb₄O₇. It will be noted that both curves 30 and 32 in FIG. 2 extend in generally similar directions and each shows an appreciable rise in Verdet values nearer the shorter wavelengths on the graph.

The rare earth ions produce absorption bands in the zinc and alumino borate glasses. In general, these glasses would be useful in wavelengths where absorptions occur. For instance, the praseodymium glass has a highly transparent region between about .65 micron and .9 micron, and dysprosium glass between about .5 and .65 micron. In addition, there are other narrow transmission regions in these glasses which may prove useful. The terbium alumino borate glass is especially attractive because it has a very broad transmission range, as shown by the absorbence curve in FIG. 3 (the particular glass used for making this plot contains 60% by weight Tb₄O₇). The absorbence λ is the parameter which appears in the following equation:

$$I_{(x_2)} = I_{(x_1)} e^{-\lambda(x_2 - x_1)} \quad (6)$$

That relates the light intensity at points $x_1$ and $x_2$ along the light beam in the glass, with the absorbence being a measure of the internal loss in the glass.

Terbium oxide is often preferred for inclusion in a glass according to the present invention because of its low absorbence throughout a wide range of wavelengths from about .4 micron to 1.5 microns. However, because of the relative expense of a terbium alumino borate glass, at certain times, the high dysprosium oxide alumino borate glass is used as a Faraday rotation means for light in the .5 micron to a .7 micron region. In like manner, the high praseodymium oxide alumino borate glass is used satisfactorily as a rotator for light within the .65 micron to .9 micron region, and also for a narrow row band at .51 micron to .55 micron, and for a somewhat wider band between 1.1 microns and 1.2 microns.

Since Faraday rotation in trivalent rare earth metal oxide zinc and alumino borate glasses is fairly large at ordinary room temperatures, it is possible to subject the rotator to a sinusoidal magnetic field by connecting the solenoid 16 to a source of alternating current within a frequency range from approximately 15 to 10,000 cycles per second to thereby obtain what might be called a Faraday modulation cell for use in a high accuracy photoelectric ellipsometer or the like.

It is also possible to use such a modulation cell at lower than room temperatures and obtain an increased magnitude for the Verdet constant. For example, the Faraday rotation will be increased as much as three or four times when a cell is cooled by liquid nitrogen. Or when used with liquid helium, the amount of Faraday rotation provided by the cell will be much greater. However, the high frequency response of such a cell at liquid helium temperature will be greatly decreased and, at this temperature, the cell will operate best within a range from approximately 15 to 200 cycles per second. In cases wherein liquid nitrogen is used, the high end of such a frequency range will likewise be reduced but by a lesser amount than that produced by liquid helium.

In FIG. 4 is shown a light polarizer 12' followed by a quarter-wave birefringent retardation plate 34 secured thereto with its fast or slow axis at 45° to the plane of polarization of the polarizer. Those two members may be used together in place of the single polarizer 12 in FIG. 1, and when so located in the system, the light 20' passing therethrough and incident upon the entrance end of the Faraday rotator 10 will be circularly polarized light. Since the index of refraction for the circularly polarized wave may be controlled by the magnetic field intensity as shown by Equations 1 and 2, and the phase of the transmitted light can be changed or shifted as desired by changing the value of the field H. (If the light being supplied to the Faraday rotator 10 is elliptically polarized light, it can be made circularly polarized light for use in such a phase shift system by the choice of a birefringent plate of proper thickness and by using this plate properly oriented relative to the plane of polarization of the incident polarized light.)

If a second polarizer, like that shown at 36 in FIG. 5, is arranged in optical alignment in the arrangement of FIG. 1 so as to receive the light transmitted by element 10 and while the transmitted light is being rotated 45° by the magnetic field, and if this second polarizer has its plane of polarization 38 positioned parallel to the plane of polarization of this transmitted light, as indicated by arrow 40, this light indicated by arrow 42 will be transmitted through the second polarizer 36. Such an arrangement can be used as a Faraday isolator. This is because light such as that indicated by arrow 44 travelling in the reverse direction cannot pass through the system. This reversely-directed light after passing through second polarizer 36 will be plane polarized and then be rotated another 45° by the Faraday rotator 10, with the result that the plane of polarization of this light will then be at 90° to the transmission axis of the first polarizer 12 and this light will not be allowed to pass therethrough.

If the Faraday rotation in the glass is less than 45°, the first and second polarizers are oriented with their transmission axes at an angle 90° minus the Faraday rotation angle in the glass. In this manner, the light travelling in the reverse direction 44 is completely blocked while the forwardly travelling light 42 is partially transmitted.

If the first polarizer 12 (FIG. 1) and the second polarizer 36 are positioned at opposite sides of the Faraday rotator 10 and with their respective axes of polarization at right angles to each other, it is possible to use this organization of parts as a Faraday shutter and no light will be transmitted when element 10 is not excited. However, if the solenoid 16 is then energized with a pulse of current of suitable magnitude, a magnetic field will be produced which will rotate the plane of polarization of the light 90° and the light will be allowed to pass through. In practice, a Faraday rotation of less than 90° can also be used satisfactorily at times to provide shutter action.

It would also be possible, when the rotator is to be used with plane polarized light, as in a Faraday isolator or in a Faraday shutter arrangement, to slope the entrance and exit surfaces 48 and 50 of the Faraday rotator element, as shown at 52 in FIG. 6, by an amount equal to the Brewster angle of incidence $i_B$ (57°30'). This sloping of the entrance surface would permit incoming plane polarized light in the plane of incidence of the surface to be transmitted without any material loss thereof due to surface reflections.

In FIG. 7 is shown a modified form of Faraday rotator member 54 which has each of its opposite ends cut on such a sloping angle that light normal to an entrance surface 56 will enter and will be internally reflected a number of times at flat silver or aluminum coated side wall portions 58 and 60 before emerging therefrom through exit end surface 62. Since the direction of Faraday rotation depends only upon the direction of the magnetic field, such a device can be used, for example, with magnet means 64 disposed with opposed poles at opposite sides of the rotator for controlling the rotation and even direction of rotation obtained. An arrangement of this kind not only increases the optical path length for the light and thus the Faraday rotation obtained but as a result thereof allows magnetics of smaller sizes to be used therewith.

In FIG. 8 is shown an arrangement wherein an elongated Faraday rotator element 66 is arranged not only for a plurality of internal reflections for longer path length for the light in passing therethrough, but also which has its entrance surface 68 (and exit surface, not shown) so sloped as to accommodate the light entering therethrough at the Brewster angle $i_B$. As stated previously, this will provide less loss of light due to reflections from the entrance surface. Also, the entrance and exit surfaces of element 66 (and also elements 10, 52 and 60) can be coated with reflection-reduction coatings if desired.

Figure 9B:
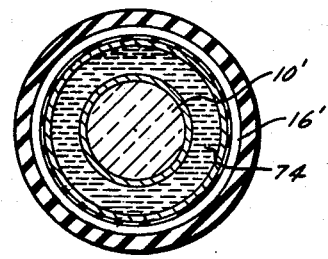

Glass composed according to the present invention is also used as an isolator at temperatures lower than room temperature to take advantage of the increase in rotation with decreasing temperature (as shown by the plot of FIG. 2). The rare earth zinc or alumino borate glass element 10' is enclosed in a jacket 74 containing liquid nitrogen or any other desirable coolant as shown in the isolator configuration of FIG. 9A. A second evacuated jacket 76 is placed over the ends of the rotator glass 10' to prevent moisture from condensing on the cooled glass. Optical windows 78 are placed at the ends of these jackets 76, which are made sufficiently long so that the windows 78 are almost at room temperature. Jets of dry nitrogen or any other drying gas may be placed to be directed onto these windows to keep them free of moisture. The solenoid winding 16' encircles the coolant jacket 74 as shown in the end view of FIG. 9B.

Having described our invention, we claim:

1. A Faraday rotation device providing good light transmission characteristics for optical energy of a preselected wavelength when passing therethrough and having a large Verdet constant at said wavelength when subjected to a predetermined magnetic field, said device comprising an elongated member of glass and magnetic means disposed in adjacent relation to side wall portions thereof for subjecting said member to the magnetic field of said magnetic means, said glass member being formed of a zinc borate glass having as an essential ingredient thereof a substantial amount of a trivalent rare earth metal oxide.

2. A Faraday rotation device providing good light transmission characteristics for optical energy of a preselected wavelength when passing therethrough and having a large Verdet constant at said wavelength when subjected to a predetermined magnetic field, said device comprising an elongated member of glass and magnetic means disposed in adjacent relation to side wall portions thereof for subjecting said member to the magnetic field of said magnetic means, said glass member being formed of a zinc borate glass having as an essential ingredient thereof a substantial amount of a trivalent rare earth metal oxide selected from a group consisting of praseodymium oxide, dysprosium oxide, terbium oxide and mixtures thereof.

3. A Faraday rotation device providing good light transmission characteristics for optical energy of a preselected wavelength when passing therethrough and having a large Verdet constant at said wavelength when subjected to a predetermined magnetic field, said device comprising an elongated member of glass and magnetic means disposed in adjacent relation to side wall portions thereof for subjecting said member to the magnetic field of said magnetic means, said glass member being formed of a glass consisting essentially of the following ingredients:

| | Percent by weight |
|---|---|
| $Al_2O_3$ | 0.0–10.0 |
| $SiO_2$ | 0.0–5.0 |
| $B_2O_3$ | 15.0–50.0 |
| ZnO | 0.0–10.0 |
| Rare earth oxides | 40.0–75.0 |

4. The combination defined in claim 3 in which the trivalent rare earth metal oxide is selected from a group consisting of praseodymium oxide, dysprosium oxide, terbium oxide and mixtures thereof.

5. A Faraday rotation device providing good light transmission characteristics for optical energy of a preselected wavelength when passing therethrough and having a large Verdet constant at said wavelength when subjected to a predetermined magnetic field, said device comprising an elongated member of glass having optically finished light transmitting flat surfaces disposed in parallel relation to each other at opposite ends of said member, and magnetic means disposed in adjacent relation to side wall portions of said elongated member for subjecting said member to the magnetic field of said magnetic means, said glass member being formed of a zinc borate glass having as an essential ingredient thereof a substantial amount of a trivalent rare earth metal oxide selected from a group consisting of praseodymium oxide, dysprosium oxide, terbium oxide and mixtures thereof.

6. A Faraday rotation device providing good light transmission characteristics for optical energy of a preselected wavelength when passing therethrough and having a large Verdet constant at said wavelength when subjected to a predetermined magnetic field, said device comprising an elongated member of glass having optically finished light transmitting flat surfaces disposed in parallel relation to each other at opposite ends of said member, said flat surfaces being so tilted relative to the longitudinal direction of said member as to be substantially at a Brewster angle relative to light entering said member through one of said flat surfaces and traveling substantially longitudinally through said member, and magnetic means disposed in adjacent relation to side wall portions of said elongated member for subjecting said member to the magnetic field of said magnetic means, said glass member being formed of an alumino borate glass having as an essential ingredient thereof a substantial amount of a trivalent rare earth metal oxide selceted from a group consisting of praseodymium oxide, dysprosium oxide, terbium oxide and mixtures thereof.

7. A Faraday rotation device providing good light transmission characteristics for optical energy of a preselected wavelength when passing therethrough and having a large Verdet constant at said wavelength when subjected to a predetermined magnetic field, said device comprising an elongated member of glass having optically finished light transmitting flat surfaces disposed in parallel relation to each other at opposite ends of said member, said flat end surfaces being so tilted relative to the longitudinal direction of said member that light travelling in a direction normal to one of said flat end surfaces and entering said member therethrough will be totally internally reflected a plurality of times by side wall portions of said member before exiting through the other of said flat end surfaces, and magnetic means disposed in adjacent relation to side wall portions of said elongated member for subjecting said member to the magnetic field of said magnetic means, said glass member being formed of an alumino borate glass having as an essential ingredient thereof a substantial amount of a trivalent rare earth metal oxide selected from a group consisting of praseodymium oxide, dysprosium oxide, terbium oxide and mixtures thereof.

8. A Faraday rotation device providing good light transmission characteristics for optical energy of a preselected wavelength when passing therethrough and having a large Verdet constant at said wavelength when subjected to a predetermined magnetic field, said device comprising an elongated member of glass having optically finished light transmitting flat surfaces disposed in parallel relation to each other at opposite ends of said member, said flat end surfaces being so tilted relative to the longitudinal direction of said member that light impinging upon one of said flat end surfaces and entering said member therethrough will have an angle of incidence at said surface substantially equal to a Brewster angle and will be totally internally reflected a plurality of times by side wall portions of said member before exiting through the other of said flat end surfaces, and magnetic means disposed in adjacent relation to side wall portions of said elongated member for subjecting said member to the magnetic field of said magnetic means, said glass member being formed of an alumino borate glass having as an essential ingredient thereof a substantial amount of a trivalent rare earth metal oxide selected from a group consisting of praseodymium oxide, dysprosium oxide, terbium oxide and mixtures thereof.

9. A Faraday rotation device providing good light transmission characteristics for optical energy of a preselected wavelength when passing therethrough and having a large Verdet constant at said wavelength when subjected to a predetermined magnetic field, said device comprising an elongated member of glass having optically finished light transmitting flat surfaces disposed in parallel relation to each other at opposite ends of said member, said flat end surfaces being so tilted relative to the longitudinal direction of said member that light impinging upon one of said flat end surfaces and entering said member therethrough will have an angle of incidence at said surface substantially equal to a Brewster angle and will be totally internally reflected a plurality of times by side wall portions of said member before exiting through the other of said flat end surfaces, and magnetic means disposed in adjacent relation to side wall portions of said elongated member for subjecting said member to the magnetic field of said magnetic means, said glass member being formed of a zinc borate glass having as an essential ingredient thereof a substantial amount of a trivalent rare earth metal oxide selected from a group consisting of praseodymium oxide, dysprosium oxide, terbium oxide and mixtures thereof.

References Cited

UNITED STATES PATENTS 3,318,652   5/1967   Berger et al.

DAVID SCHONBERG, Primary Examiner.

PAUL R. MILLER, Assistant Examiner.

U.S. Cl. X.R.

350—152, 157, 160